United States Patent Office 2,989,392
Patented June 20, 1961

2,989,392
METHOD OF CONTROLLING UNDESIRABLE VEGETATION
Joseph W. Baker, Nitro, W. Va., assignor to Monsanto Chemical Company, St. Louis, Mo., a corporation of Delaware
No Drawing. Filed Apr. 14, 1958, Ser. No. 728,103
3 Claims. (Cl. 71—2.3)

The present invention relates to methods of destroying or controlling vegetation. More particularly it relates to methods of destroying or controlling vegetation by applying thereto a toxic concentration of a compound of the structure

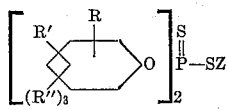

R, R' and R" representing the five substituents on the carbon of a phenyl radical. R represents a halogen substituent, preferably chlorine or bromine, R' is preferably another halogen but may be hydrogen, lower alkyl or phenyl and R" is preferably halogen but may be hydrogen. Z represents hydrogen, a metal salt forming group, ammonium, alkyl, di(loweralkyl)aminoethyl or N,N-di-(loweralkyl)aniline salt forming groups.

Many of the O,O-di(halophenyl)phosphorodithioates suitable for the practice of this invention and methods for their preparation are known. Usually the products prepared by condensing four molecular proportions of a halophenol and one molecular proportion of $P_2S_5$ are satisfactory for use without further purification. The products form in essentially quantitative yield by heating the reactants at 140–150° C. for 1–3 hours. For example, 789.8 parts by weight of 2,4,5-trichlorophenol was melted and to the molten phenol 222.3 parts by weight of $P_2S_5$ was added. The temperature was raised to 140° C., at which point the heat of reaction carried the temperature to 155° C. The mixture was cooled to 145° C. and heated at 140–148° C. for 1.5 hours. The product was a light yellow liquid analyzing 6.4% phosphorus and 13.3% sulfur as compared to 6.3% phosphorus and 13.1% sulfur calculated for $C_{12}H_5Cl_6O_2PS_2$. The neutralization number was 116.5 as compared to the calculated value of 115.

Other examples obtainable in similar manner comprise O,O-bis(2,4-dichlorophenyl) S-hydrogen phosphorodithioate, a yellow liquid; O,O-bis(p-chlorophenyl) S-hydrogen phosphorodithioate, a light yellow liquid; O,O-bis(2,4,6-trichlorophenyl) S-hydrogen phosphorodithioate, a sticky solid; O,O-bis(o-chlorophenyl) S-hydrogen phosphorodithioate, a yellow liquid; O,O-bis(2,4-dibromophenyl) S-hydrogen phosphorodithioate, a grey solid; O,O-bis(p-bromophenyl) S-hydrogen phosphorodithioate, a viscous amber liquid; O,O-bis(m-chlorophenyl) S-hydrogen phosphorodithioate, a yellow liquid; O,O-bis (2-chloro-p-biphenylyl) S-hydrogen phosphorodithioate, a viscous amber liquid and O,O-bis(4-chloro-3-methylphenyl) S-hydrogen phosphorodithioate, a yellow solid.

Occasionally it is necessary to filter off a small amount of unreacted $P_2S_5$. Reaction with 2,4,6-trichlorophenol is rather sluggish and required 3 hours' heating at 140–150° C. Reaction with 2,4-dibromophenol is also rather sluggish but p-bromophenol reacts rapidly at 125° C. and 30 minutes heating at 120–130° C. is sufficient. The products are insoluble in water but soluble in common organic solvents.

The reaction of pentachlorophenol with $P_2S_5$ is less definite than reaction of lower chlorinated phenols. After refluxing four molecular proportions of pentachlorophenol and one molecular proportion of $P_2S_5$ in xylene for 6 hours, the reaction mixture deposited a solid product upon cooling to 50° C. This fraction (No. 1) and the reaction remaining after removal of solvent (No. II) were found to be very effective herbicides.

Metal and ammonium salts of the acids may be prepared by the usual methods. Zinc O,O-bis(2,4-dichlorophenyl) phosphorodithioate was prepared by adding 50 parts of zinc dust to 600 parts of the thio acid at 90° C., heating for 4 hours, then stripping in vacuo at 90° C. 10 mm./Hg and filtering the residue through a layer of clay. The sodium salt was prepared by condensing sodium methylate (10.3 parts) and bis(2,4-dichlorophenyl) S-hydrogen phosphorodithioate (84.0 parts) in benzene. The reaction was slightly exothermic and the solid product precipitated from solution. The ammonium salt resulted from passing $NH_3$ gas into a benzene solution of the thio acid at 25–30° C. The salt precipitated from solution and was readily isolated. Amine salts are also suitable and form readily by mixing the amine and thio acid and heating gently. They are dark viscous liquids.

The esters may be prepared by heating a halide of the desired ester constituent with the thio acid in the presence of an esterification catalyst. O,O-bis(2,4-dichlorophenyl) S-(2-diethylaminoethyl) phosphorodithioate was produced by refluxing 42 parts by weight of O,O-bis(2,4-dichlorophenyl) S-hydrogen phosphorodithioate, 39.0 parts by weight of 19.4% sodium ethylate and 15.0 parts by weight of diethylaminoethyl chloride for 1 hour. The product was isolated by removing the solvent under reduced pressure, taking up the residue in chloroform and the resulting solution extracted with sodium bicarbonate solution followed by water and again removing the solvent. The product was a brown viscous liquid.

The compounds of this invention comprise effective contact herbicides. Pre-emergence activity is also observed with some as well as formative action and chlorosis on certain plants. The toxicants may be applied conveniently in the form of a spray containing the active ingredient in a concentration within the range of 0.05 to 10.0% by weight. Thorough coverage of the foliage is effective for contact killing. For pre-emergence control of plants amounts within the range of 3 to 50 pounds per acre may be used. By applying the toxicant to the plant is meant any means whereby it is brought into contact with living plants, as for example by application to the ground before the plants emerge or by direct application to the foliage.

Although most of the toxicants are insoluble in water, they are soluble in common organic solvents. They may be dispersed directly in water or a solution in an organic solvent emulsified in aqueous medium by the aid of a dispersing agent. As dispersing and wetting agents there may be employed soft or hard sodium or potassium soaps, alkylated aromatic sodium sulfonates, such as sodium dodecylbenzene sulfonate, an amine salt, as for example dibutylammonium dodecylbenzenesulfonate, alkali metal salts of sulfated fatty alcohols, ethylene oxide condensation products of alkyl phenols, or tall oil or higher mercaptans and other dispersing and wetting agents. Formulation of dry compositions is accomplished by mixing with finely divided solid carriers. Suitable carriers comprise talc, clay, pyrophyllite, silica and fuller's earth. Usually the toxicant will be only a minor proportion. The dry formulation may be used as a dust or dispersed in aqueous medium before application. If the latter it is convenient to incorporate a wetting or dispersing aid into the formulation.

A spray containing various concentrations of the active ingredient shown in Table I was applied to the foliage of bean plants, to the foliage of a mixture of grasses and finally to the foliage of a mixture of broadleaved plants. The mixture is indicated in the table as "Broadleaf." A rating of 0 indicates no phytotoxicity, 1 slight, 2 moderate, 3 severe phytotoxicity, 4 plants dead and B defoliation.

Table I

| Active Ingredient | Conc., Percent | Phytotoxicity Rating |||
|---|---|---|---|---|
| | | Bean | Grass | Broadleaf |
| O,O-Bis(2,4,5-trichlorophenyl)S-hydrogen phosphorodithioate. | 0.5 | 2 | 1+ | 4 |
| | 0.2 | 2 | 2 | 4 |
| | 0.05 | 1 | 0 | 2 |
| O,O-Bis(p-chlorophenyl)S-hydrogen phosphorodithioate. | 0.5 | 3 | 1 | 3 |
| | 0.2 | 0 | 1 | 1 |
| O,O-Bis(o-chlorophenyl)S-hydrogen phosphorodithioate | 0.5 | 1 | 1 | 2 |
| O,O-Bis(m-chlorophenyl)S-hydrogen phosphorodithioate. | 0.5 | 3+ | 1 | 3+ |
| | 0.2 | 0 | 0 | 1 |
| O,O-Bis(2-chloro-p-biphenylyl)S-hydrogen phosphorodithioate | 0.5 | 1 | ¹1B | 2+ |
| O,O-Bis(4-chloro-3-methylphenyl)S-hydrogen phosphorodithioate | 0.5 | 1+ | 0 | 2+ |
| R.P. pentachlorophenol and P₂S₅ Fraction I. | 0.5 | 4 | 4 | 4 |
| | 0.2 | 2 | 3 | 3 |
| | 0.05 | 1 | 1 | 2 |
| R.P. pentachlorophenol and P₂S₅ Fraction III. | 0.5 | 4 | 4 | 4 |
| | 0.2 | 3 | 3 | 4 |
| | 0.05 | 1 | 2 | 2 |
| Ammonium O,O-bis(2,4-dichlorophenyl) phosphorodithioate | 0.5 | 1 | 0 | 2+ |
| O,O-Bis(2,4-dichlorophenyl)S-(2-diethylaminoethyl) phosphorodithioate | 0.5 | 0 | 1 | 2+ |
| O,O-Bis(2,4-dichlorophenyl)S-sodium phosphorodithioate | 0.5 | 1+ | 1 | 2 |
| O,O-Bis(2-benzyl-4-chlorophenyl) S-hydrogen phosphorodithioate | 0.5 | 1 | 1 | 1 |
| N,N-Dimethylaniline salt of O,O-bis(2,4,5-trichlorophenyl)S-hydrogen phosphorodithioate | 0.5 | 1 | 2+ | 1 |

¹ 50% defoliation.

The data recorded in Table II demonstrate pre-emergence activity. The toxicant was applied at the rate of 25 pounds per acre and the phytotoxicity observed. It was further found that Fraction I of the reaction product of pentachlorophenol and P₂S₅ retained activity at 10 pounds per acre and Fraction II retained activity at 3 pounds per acre.

Table II

| Active Ingredient | Results Observed |
|---|---|
| R.P. pentachlorophenol and P₂S₅, Fraction I. | Severe phytotoxicity to crab grass, brome grass, buckwheat, mustard (radish), beet-sugar, foxtail and pigweed. Foxtail and buckwheat abnormal. Rye grass tip injury. |
| R.P. pentachlorophenol and P₂S₅, Fraction II. | Severe phytotoxicity to crab grass, morning glory, brome grass, rye grass, buckwheat, mustard (radish), beet-sugar, foxtail, barnyard grass, field bindweed and pigweed. Wild oat, morning glory and buckwheat abnormal. Cotton chlorotic. Radish edge chlorosis. |
| O,O - Bis(2 - benzyl -4 - chlorophenyl) S-hydrogen phosphorodithioate. | Severe phytotoxicity to crab grass, brome grass, corn, barnyard grass and pigweed. |

It is intended to cover all changes and modifications of the examples of the invention herein chosen for purposes of disclosure which do not constitute departures from the spirit and scope of the invention.

What is claimed is:

1. The method of controlling vegetation which comprises applying to the foliage thereof a toxic concentration of a phytotoxic compound of the structure

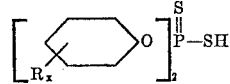

where R is chlorine and $x$ is an integer from 3 to 5 inclusive.

2. The method of controlling vegetation which comprises applying to the foliage thereof a toxic concentration of a phytotoxic compound of the structure

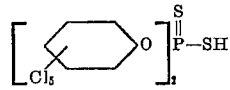

3. The method of controlling vegetation which comprises applying to the foliage thereof a toxic concentration of O,O-bis(2,4,5-trichlorophenyl) S-hydrogen phosphorodithioate.

References Cited in the file of this patent

UNITED STATES PATENTS

| 2,831,015 | Tolkmith | Apr. 15, 1958 |
| 2,841,486 | Osborn et al. | July 1, 1958 |
| 2,857,308 | Baker | Oct. 21, 1958 |

OTHER REFERENCES

Ahlgren et al.: "Principles of Weed Control," pages 267 and 268 of special interest. Published by John Wiley and Sons, Inc., N.Y., copyright 1951.